Figure 1:
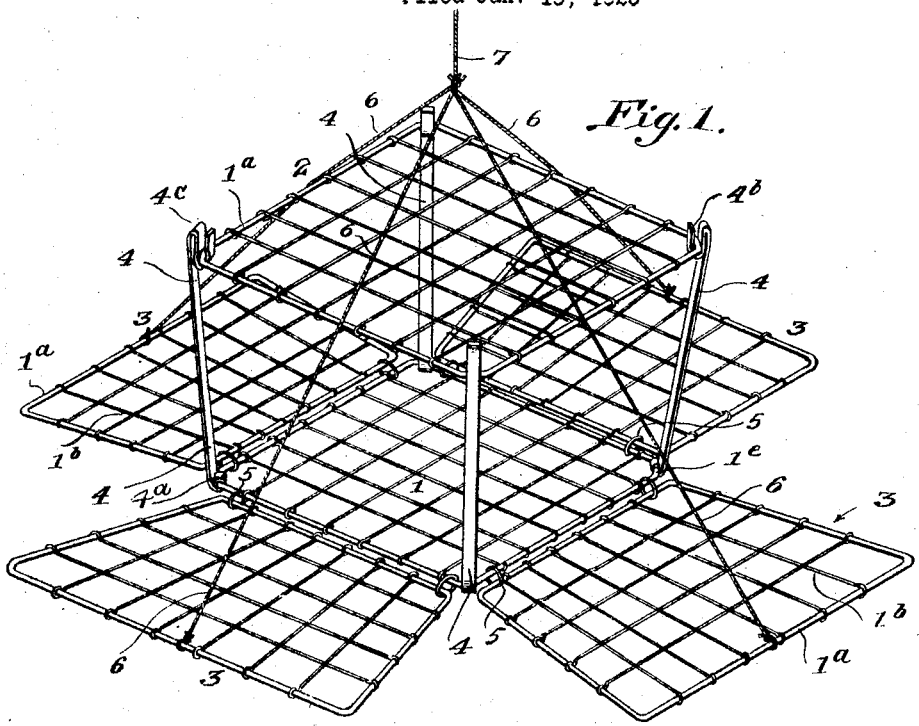

March 31, 1925.

G. MERLE, SR

CRAB TRAP

Filed Jan. 19, 1923

1,531,299

Inventor:
George Merle Sr.

Patented Mar. 31, 1925.

1,531,299

UNITED STATES PATENT OFFICE.

GEORGE MERLE, SR., OF BROOKLYN, NEW YORK.

CRAB TRAP.

Application filed January 19, 1923. Serial No. 613,774.

*To all whom it may concern:*

Be it known that I, GEORGE MERLE, Sr., a citizen of the United States, residing at Brooklyn, in the county of Queens and State of New York, have invented certain new and useful Improvements in Crab Traps, of which the following is a specification.

My invention relates to improvements in crab traps and principally in the provision of what is known as collapsible traps of this class, and the object of the invention is to provide improved means for detachably supporting the top member of traps of this class in connection with the bottom member thereof by means of four stanchions or rod members having a hinged mounting to the corners of the bottom member of the trap, said corners being arranged at substantially 45 degrees to the rods of the bottom member, and a detachable tensional mounting to the corners of the top member of the trap, said corners being arranged at substantially 45 degrees to the rods of the top member; and with this and other objects in view, the invention consists in a crab trap of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Figure 2:
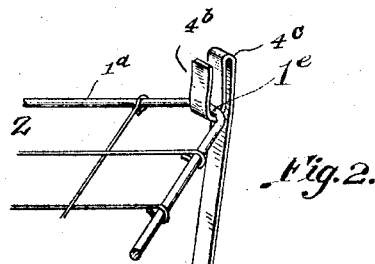

Fig. 1 is a perspective view of a crab trap made according to my invention; and, Fig. 2 is a detail view of one of the stanchions or supporting rods which I employ.

In the drawing, 1 represents the bottom member or section of the trap, 2 the top member or section, and both of these sections are substantially rectangular in form and composed of a wire frame with a wire mesh body. Four side sections 3 are also employed and are movably connected with or hinged to the bottom section 1, by loops 5 and the side sections 3 are composed of substantially rectangular frames $1^a$ having a wire mesh body $1^b$.

Four standards 4 are employed and these standards are preferably composed of flat strips or rods, one of the ends of which are fashioned to form loops which encircle angular or flattened corners $1^c$ of the bottom member or section 1 as shown at $4^a$ and the other or upper ends of the standards are fashioned to form hook-shaped portions $4^b$ into which the angular or flattened corners $1^e$ of the top member or section 2 are adapted to be frictionally passed, and the parts $4^c$ of the hook-shaped portions $4^b$ act as clamps to retain the top section in position on the standards, and the angular or flattened corners facilitate the rigid mounting of the separate top and bottom members one with the other.

Secured centrally of the outer edges of the separate members or sections 3 are cords 6 which join with a single operating cord 7 and by means of the cords 6 and 7 the sections 3 may be moved from an open to a closed position in the usual manner in traps of this class.

The operation or use of my improved trap will be the same as similar traps of its class, it being understood that the bait is placed within and secured to the top face of the bottom section and the side sections 3 normally lie flat upon the bottom of a river or other body of water, and a pull on the cord 7 will move the sections 3 into a closed position. It will also be noted that the bottom member or section 1 is of less dimensions than the top section 2 and the side sections 3 flare outwardly to form a substantially box-shaped trap, when the side sections are in a closed position.

When it is desired to knock down the trap for shipment or for carrying from place to place, the top member 2 is detached from the hook-shaped end portions $4^b$ of the standards 4, and said standards are folded inwardly upon the bottom section 1, and the side sections folded on said bottom section, thus forming a neat and compact package, and with my improved trap construction, it will be understood that the trap may be knocked down and set up for use in a very few moments and without any skill or care on the part of the operator, and by reason of the construction employed, I provide a strong and durable trap, and while I have shown certain details of construction for carrying my invention into effect, it will be understood that I am not necessarily limited to these details and various changes therein and modifications thereof may be made within the scope of the appended claims without departing from the spirit of my invention or sacrificing its advantages.

Having fully described my invention, what I claim as new and desire to secure by Letters Patent, is:—

1. A trap of the class described comprising a bottom section, side sections movably mounted in connection with the bottom section, independent standards pivotally mounted in connection with the corner portions of said bottom section, a top section independent of said bottom and side sections, means for detachably mounting the corner portions of said top section in connection with the free ends of said standards, and the corner portions of said bottom section and top section being flattened.

2. A trap of the class described comprising a bottom section, side sections movably mounted in connection with the bottom section, standards movably mounted in connection with the corner portions of said bottom section, a top section independent of said bottom and side sections, means for detachably mounting the corner portions of said top section in connection with the free ends of said standards, the corner portions of said bottom section and top section being flattened, and said standards being composed of flat strips or rods, one end of which are looped to engage the flattend corners of the bottom section.

3. A trap of the class described comprising a bottom section, side sections movably mounted and retained in connection with said bottom section, a top section independent of said bottom and side sections, standards movably mounted in connection with the corner portions of said bottom section and adapted to be folded thereon and to be extended in a vertical position, the upper ends of said standards being provided with spring clamps adapted to receive and frictionally retain the corner portions of the top section therein, the corner portions of said top and bottom sections being flattened, and said standards being composed of flat strips of sheet metal to fit the flattened corners of said sections.

4. A trap of the class described comprising a bottom section having flattened corner portions, side sections movably mounted in connection with the bottom section, a top section independent of said bottom and side sections, standards for coupling said top and bottom sections in spaced relation, and said standards having bearing portions fashioned to fit snugly on the flattened corner portions of the bottom section for pivotally mounting said standards in connection therewith.

5. A trap of the class described comprising a bottom section, side sections movably mounted in connection with the bottom section, a top section independent of said bottom and side sections, the corner portions of the top and bottom sections being flattened, standards pivotally mounted in connection with the corner portions of the bottom section and detachably mounted in connection with the corner portions of the top section and the pivotal and detachable mountings of the standards in connection with said sections being formed by comparatively wide bearings fitting snugly on the flattened corners of said sections whereby said sections are firmly coupled together.

In testimony that I claim the foregoing as my invention I have signed my name in presence of the subscribing witnesses this 15th day of August, 1922.

GEORGE MERLE, Sr.

Witnesses:
JOHN C. HARTMANN,
R. J. SCHNEIDER.